(12) United States Patent
Kuo

(10) Patent No.: US 7,677,735 B2
(45) Date of Patent: Mar. 16, 2010

(54) PROJECTING APPARATUS

(75) Inventor: Chien-Fong Kuo, Taoyuan County (TW)

(73) Assignee: Watonga Technology, Inc., Carson City, NV (US)

( * ) Notice: Subject to any disclaimer, the term of this patent is extended or adjusted under 35 U.S.C. 154(b) by 819 days.

(21) Appl. No.: 11/456,251

(22) Filed: Jul. 10, 2006

(65) Prior Publication Data

US 2007/0019167 A1    Jan. 25, 2007

(30) Foreign Application Priority Data

Jul. 21, 2005    (TW) ............................... 94124637 A

(51) Int. Cl.
  *G03B 21/28* (2006.01)
(52) U.S. Cl. .......................................... 353/51; 353/37
(58) Field of Classification Search .................. 353/69, 353/70, 49–51, 37, 98, 76, 81; 359/196, 359/223, 201, 202, 197
  See application file for complete search history.

(56) References Cited

U.S. PATENT DOCUMENTS 5,283,602 A * 2/1994 Kwon ............................ 353/69
7,128,425 B2 * 10/2006 Kumai ......................... 353/119

* cited by examiner

*Primary Examiner*—Georgia Y Epps
*Assistant Examiner*—Jerry Brooks
(74) *Attorney, Agent, or Firm*—Stevens Law Group; David R. Stevens

(57) ABSTRACT

A projecting apparatus for protecting an image onto a screen includes an image module, a first light reflection device and a lens. The image module is for providing a beam of first light. The first light reflection device has a first reflection surface disposed movably relative to the image module for reflecting the first light to form a beam of second light. The lens is for projection the image on the screen according to the second light. Moving the first light reflection device along the beam of first light or second light can adjust the location of the image on the screen in a first direction.

14 Claims, 6 Drawing Sheets

PROJECTING APPARATUS

This application claims the benefit of Taiwan application Serial No. 94124637, filed Jul. 21, 2005, the subject matter of which is incorporated herein by reference.

BACKGROUND OF THE INVENTION

1. Field of the Invention

The invention relates in general to a projecting apparatus, and more particularly to a projecting apparatus, which utilizes a prism or mirror to perform light shift and focus adjustment.

2. Description of the Related Art

In the present high-level projecting apparatus, the lens is usually equipped with mechanism for lens shift and focus adjustment to adjust the location of the image projected onto a screen and the focus location of the image relative to the screen in addition to function of adjusting image size and brightness. However, these delicate mechanisms used in the lens increase the difficulty in designing and manufacturing the lens originally complicated.

SUMMARY OF THE INVENTION

It is therefore an object of the invention to provide a projecting apparatus. By using a prism or mirror to perform light shift and projection image adjustment, the projecting apparatus achieves light shift and focus functions without influencing projection light angles. Therefore, the (complication in lens design and manufacture as well as the system manufacturing cost can be reduced.

The invention achieves the above-identified object by providing a projecting apparatus for projecting an image onto a screen. The projecting apparatus includes an image module, a first light reflection device and a lens. The image module is for providing a beam of first light. The first light reflection device has a first reflection surface disposed movably relative to the image module for reflecting the first light to form a beam of second light. The lens is for projecting the image on the screen according to the second light. Moving the first light reflection device can adjust the location of the image on the screen in a first direction.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
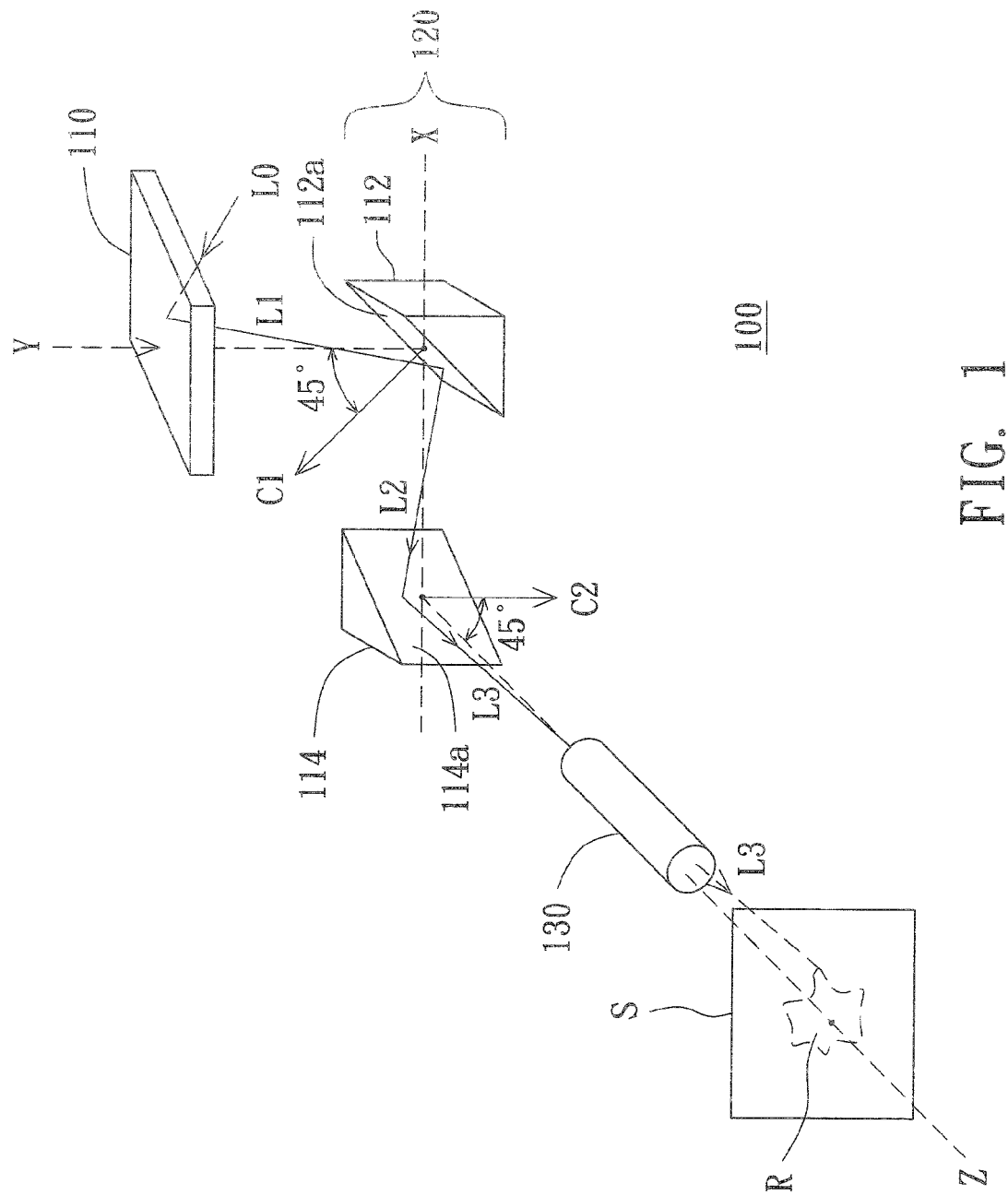
FIG. 1 is a partial solid view of a projecting apparatus according to a preferred embodiment of the invention.

Referring to FIG. 1, a partial solid view of a projecting apparatus according to a preferred embodiment of the invention is shown. The projecting apparatus 100 is used for projecting an image R onto a screen S. The projecting apparatus 100 includes an image shift device 120, an image module 110 and a lens 130. The image module 110 such as a digital micromirror device (DMD), is for reflecting a beam of projection light Lo emitted from a light source module (not shown in the figure) to provide a beam of first light L1. The image shift device 120 includes a first light reflection device 112 and a second light reflection device 114. The first light reflection device 112 and the second light reflection device 114 are prisms for instance. The first light reflection device 112 has a first reflection surface 112a for reflecting the first light L1 to form a beam of second light L2. The second light reflection device 114 has a second reflection surface 114a for reflecting the second light L2 to form a beam of third light L3. The lens 130 is used for projecting the third light L3 onto the screen S to form the image R.

As shown in FIG. 1, the central axis C1 of the first reflection surface 112a is located on the X-Y plane formed by the central connection line X connecting the centers of the first light reflection device 112 and the second light reflection device 114, and the optical axis Y of the image module 110. The central connection line X is vertical to the optical axis Y while the central axis C1 of the first reflection surface 112a is inclined by 45 degrees against the optical axis Y. Besides, the central axis C2 of the second reflection surface 114a is located on the X-Z plane formed by the central connection line X of the first light reflection device 112 and the second light reflection device 114, and the optical axis Z of the lens 130. The central connection line X is vertical to the optical axis Z while the central axis C2 of the second reflection surface 114a is inclined by 45 degrees against the optical axis Z.

It is noted that the X-Y plane is perpendicular to the X-Z plane and thus the central axis C2 of the second reflection surface 114 and the central axis C1 of the first reflection surface 112 are not coplanar. Therefor, the locations of the image R relative to the screen S in a horizontal direction (X-direction) and a perpendicular direction (Y-direction) can be adjusted by changing the locations of the first light reflection device 112 and second light refection device 114. In the following description, it is illustrated accompanied with drawings how the invention adjusts the horizontal and perpendicular locations of the image R relative to the screen S via the first light reflection device 112 and the second light reflection device 114.

Figure 2A:
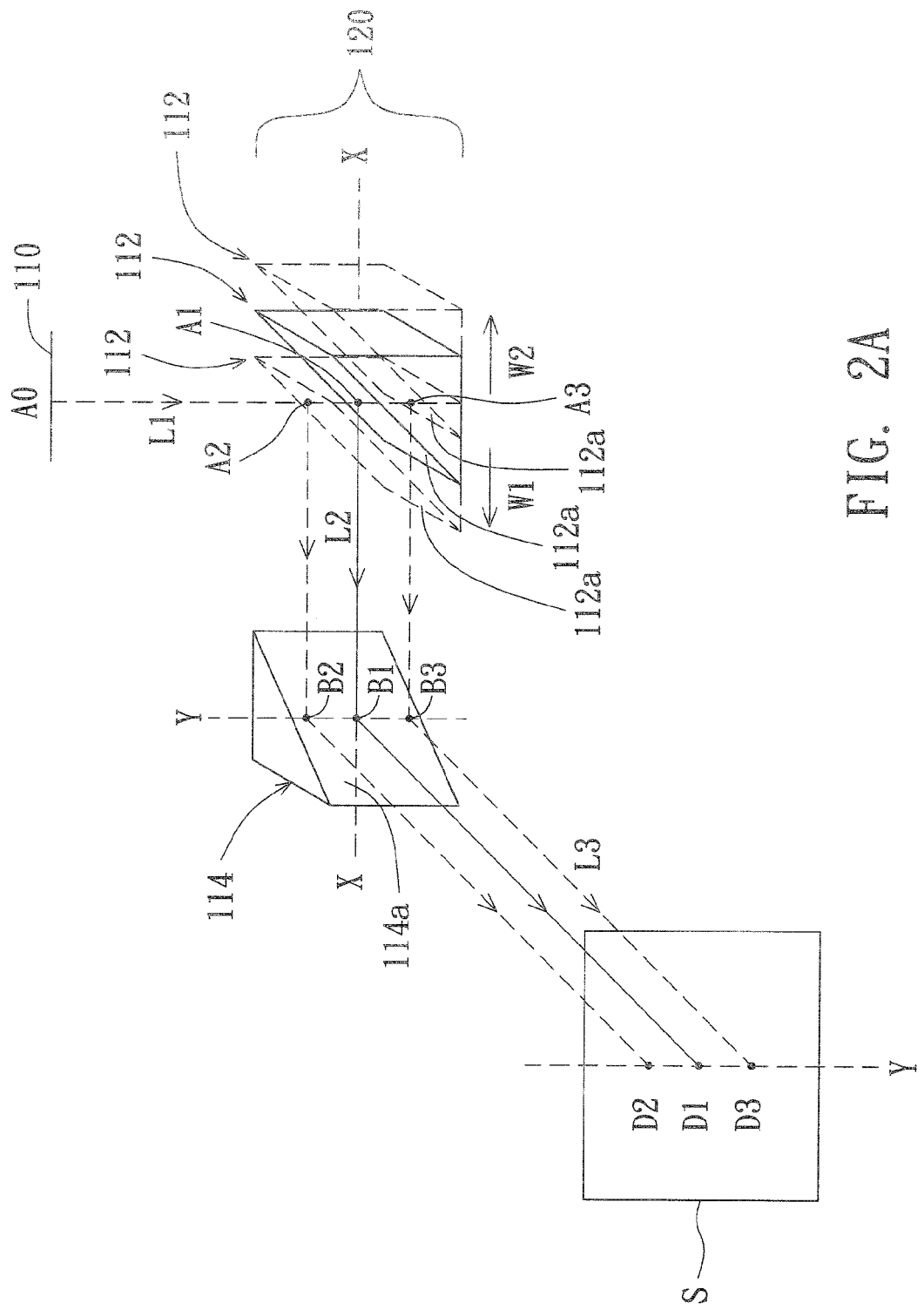
FIG. 2A is a schematic diagram of adjusting the perpendicular location of the image R on the screen S by using the image shift device 120 of FIG. 1 is shown.

Referring to FIG. 2A, a schematic diagram of adjusting the perpendicular location of the image R on the screen S by using the image shift device 120 of FIG. 1 is shown. The lens 130 is not shown in the figure for illustration convenience. The second light reflection device 114 is not shifted while the first light reflection device 112 is shifted left (as shown by the arrow W1) in the X-direction. At the time, the incident point of the first light L1 going into the first reflection surface 112a is shifted upward from the point A1 to A2 while the incident point of the second light L2 going into the second reflection surface 114a is shifted upward from the point B1 to B2. As a result, the location of the third light L3 projecting onto the screen S is also shifted upward from the point D1 to D2. Similarly, the second light reflection device 114 is not shifted while the first light reflection device 112 is shifted right (as shown by the arrow W2) in the X-direction. The incident point of the first light L1 going into the first reflection surface 112a is shifted downward from the point A1 to A3 while the incident point of the second light L2 going into the second reflection surface 114a is shifted downward from the point B1 to B3. As a result, the location of the third light L3 projecting onto the screen S is also shifted downward from the point D1 to D3. Therefore, the location of the image R on the screen S in the Y-direction (perpendicular direction) can be adjusted by shifting the first light reflection device 112 in the X-direction (horizontal direction).

Figure 2B:
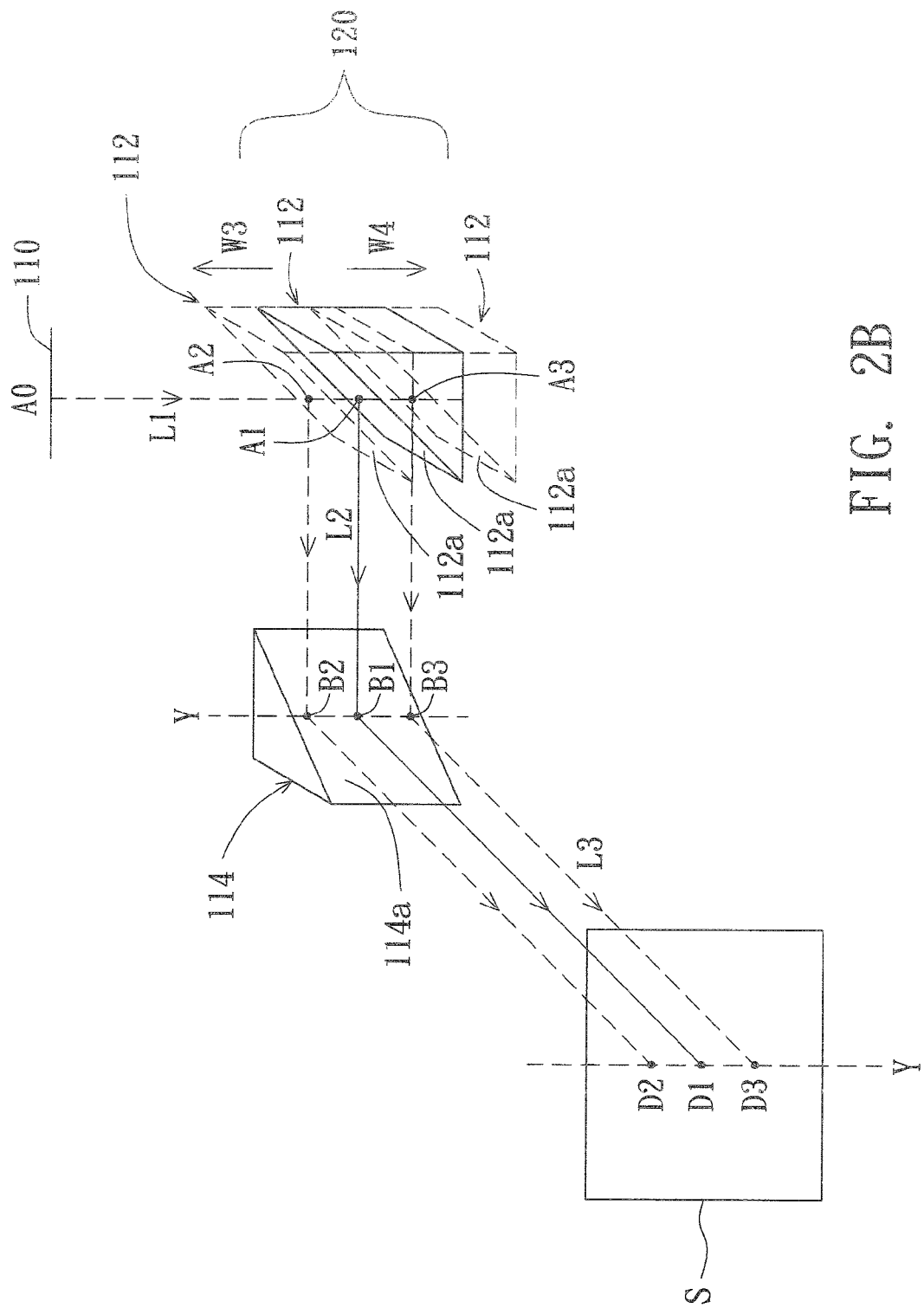
FIG. 2B is another schematic diagram of adjusting the perpendicular location of the image on the screen by using the image shift device of FIG. 1.

Furthermore, as shown in FIG. 2B, the second light reflection device 114 is not shifted while the first light reflection device 112 is shifted upward (as shown by the arrow W3) in the Y-direction. The incident point of the first light L1 going into the first reflection surface 112a can also be shifted upward from the point A1 to A2. As a result, the location of the third light L3 projecting onto the screen S can also be shifted upward from the point D1 to D2. Similarly, the second light reflection device 114 is not shifted while the first light reflection device 112 is shifted downward (as shown by the arrow W4) in the Y-direction. The incident point of the first light L1 going into the first reflection surface 112a can also be shifted downward from the point A1 to A3. As a result, the location of the third light L3 projecting onto the screen S can also be shifted downward from the point D1 to D3. Therefore, the location of the image R on the screen S in the perpendicular direction can also be adjusted by shifting the first light reflection device 112 in the Y-direction (perpendicular direction).

As shown in FIG. 2A and FIG. 2B, when the first light reflection device 112 is shifted in the X-direction or the Y-direction, the first light L1 is reflected by the first reflection surface 112a via the image module 110 to form the second light L2 while the second light L2 is reflected by the second reflection surface 114a to form the third light L3 for projecting onto the screen S. The total length of the optical path from the image module 110 to the screen S is decreased from ($\overline{A0A1}+\overline{A1B1}+\overline{B1D1}$) to ($\overline{A0A2}+\overline{A2B2}+\overline{B2D2}$) (∵ $\overline{A0A2}<\overline{A0A1}$) or increased from ($\overline{A0A1}+\overline{A1B1}+\overline{B1D1}$) to ($\overline{A0A3}+\overline{A3B3}+\overline{B3D3}$) (∵ $\overline{A0A3}>\overline{A0A1}$). Therefore, the focus location of the image R relative to the screen S can also be simultaneously adjusted by shifting the first light reflection device 112 in the X-direction (or Y-direction).

Figure 3A:
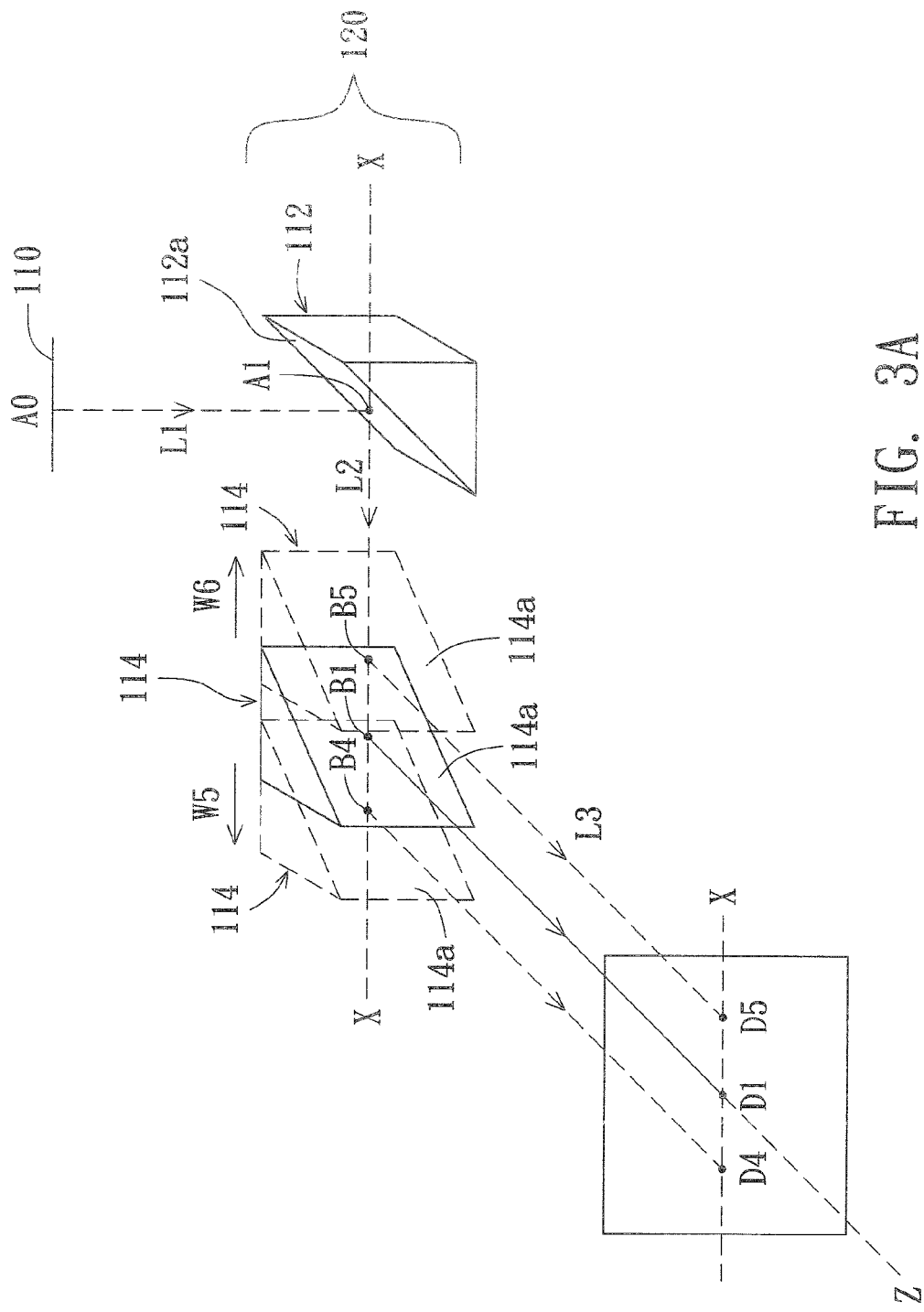
FIG. 3A is a schematic diagram of adjusting the horizontal location of the image R on the screen S by using the image shift device 120 of FIG. 1 is shown.

Referring to FIG. 3A, a schematic diagram of adjusting the horizontal location of the image R on the screen S by using the image shift device 120 of FIG. 1 is shown. The lens 130 is not shown in the figure for illustration convenience. The first light reflection device 112 is not shifted while the second light reflection device 114 is shifted left (as shown by the arrow W5) in the X-direction. At the time, the incident point of the first light L1 going into the first reflection surface 112a is not shifted and at the same point A1 while the incident point of the second light L2 going into the second reflection surface 114a is shifted left from the point B1 to B4. As a result, the location of the third light L3 projecting onto the screen S is also shifted left from the point D1 to D4. Similarly, the first light reflection device 112 is not shifted while the second light reflection device 114 is shifted right (as shown by the arrow W6) in the X-direction. The incident point of the first light L1 going into the first reflection surface 112a is not shifted and at the same point A1 while the incident point of the second light L2 going into the second reflection surface 114a is shifted right from the point B1 to B5. As a result, the location of the third light L3 projecting onto the screen S is also shifted right from the point D1 to D5. Therefore, the location of the image R on the screen S in the horizontal direction can be adjusted by shifting the second light reflection device 114 in the X-direction (horizontal direction).

Figure 3B:
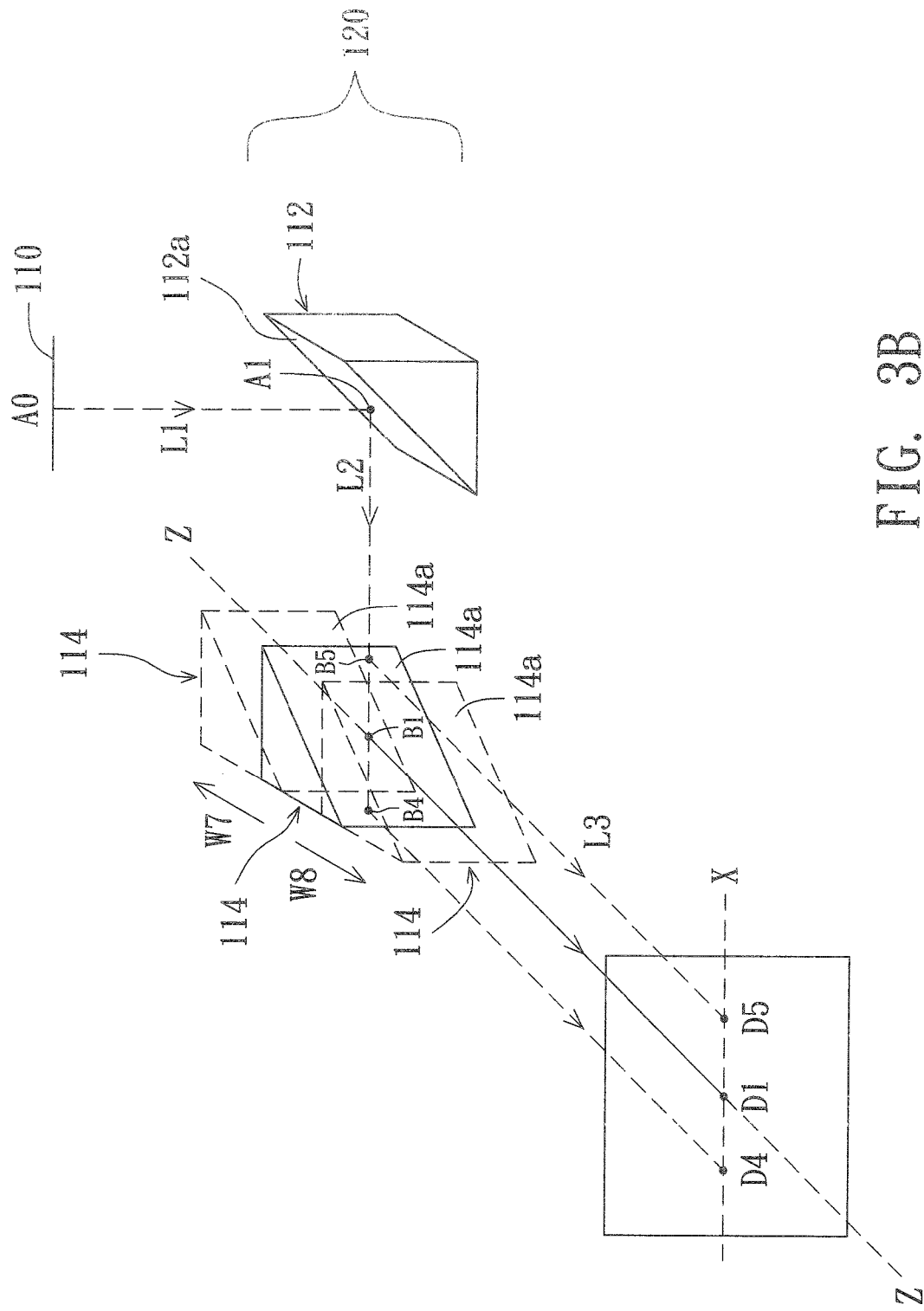
FIG. 3B is another schematic diagram of adjusting the horizontal location of the image on the screen by using the image shift device of FIG. 1.

In addition, as shown in FIG. 3B, the first light reflection device 112 is not shifted while the second light reflection device 114 is shifted backward (as shown by the arrow W7) in the Z-direction. The incident point of the second light L2 going into the second reflection surface 114a can also be shifted left from the point B1 to B4. As a result, the location of the third light L3 projecting onto the screen S can also be shifted left from the point D1 to D4. Similarly, the first light reflection device 112 is not shifted while the second light reflection device 114 is shifted forward (as shown by the arrow W8) in the Z-direction. The incident point of the second light L2 going into the second reflection surface 114a can also be shifted right from the point B1 to B5. As a result, the location of the third light L3 projecting onto the screen S is also shifted right from the point D1 to D5. Therefore, the location of the image R on the screen S in the horizontal direction can be adjusted by shifting the second light reflection device 114 in the Z-direction.

As shown in FIG. 3A and FIG. 3B, when the second light reflection device 114 is shifted in the X-direction of the Z-direction, the first light L1 is reflected by the first reflection surface 112a via the image module 110 to form the second light L2 while the second light L2 is reflected by the second reflection surface 114a to form the third light L3 for projecting onto the screen S. The total length of the optical path from the image module 110 to the screen S is increased from ($\overline{A0A1}+\overline{A1B1}+\overline{B1D1}$) to ($\overline{A0A1}+\overline{A1B4}+\overline{B4D4}$)(∵ $\overline{A1B4x}>\overline{A1B1}$) or decreased from ($\overline{A0A1}+\overline{A1B1}+\overline{B1D1}$) to ($\overline{A0A1}+\overline{A1B5}+\overline{B5D5}$) (∵ $\overline{A1B5}<\overline{A1B1}$). Therefore, the focus location of the image R relative to the screen S can also be simultaneously adjusted by shifting the second light reflection device 114 in the X-direction (or Z-direction).

Figure 4:
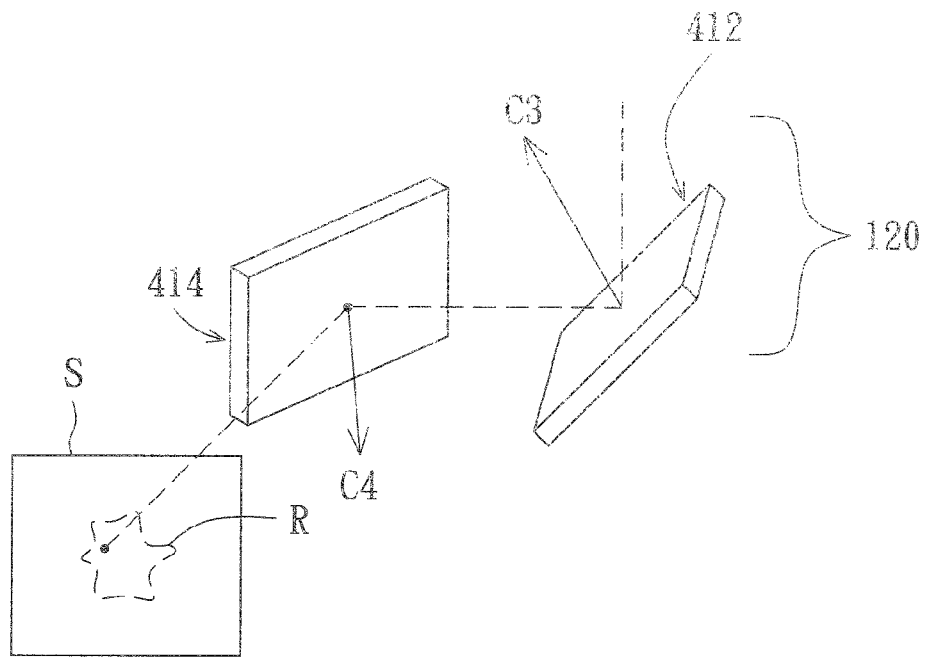
FIG. 4 is a solid view of the second structure of the image shift device of FIG. 1.
Figure 5:
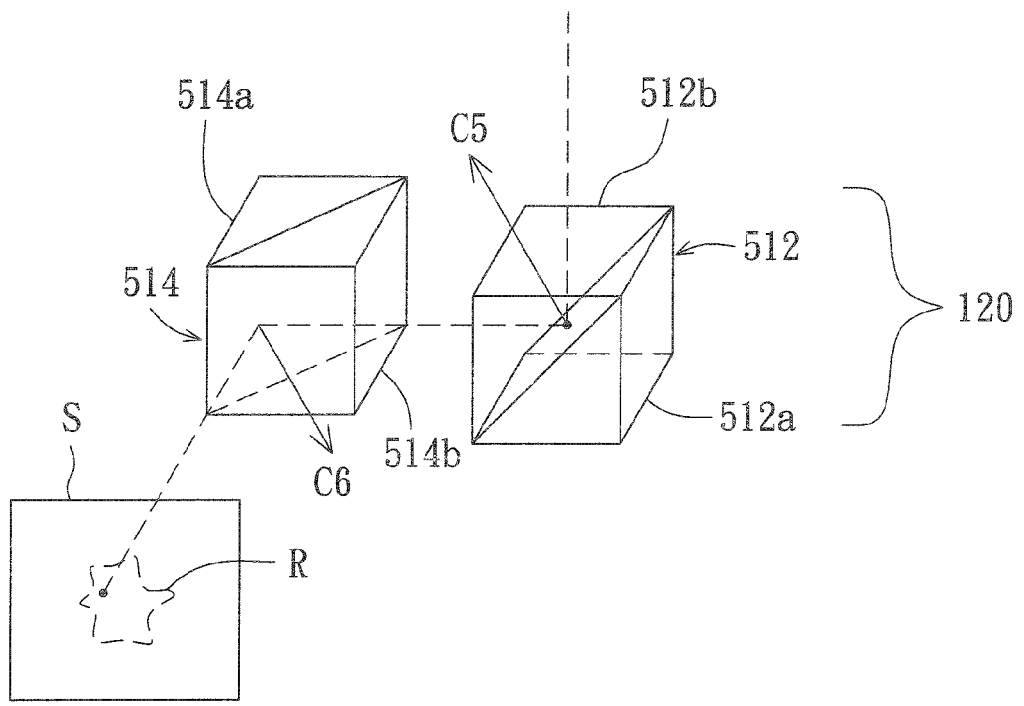
FIG. 5 is a solid view of the third structure of the image shift device of FIG. 1.

As described above, although the image shift device 120 including tow prisms is taken as an example in the invention, the image shift device 120 of the invention can also use two mirrors 412 and 414 as shown in FIG. 4 or use two prism sets 512 and 514. The prism set 512 includes two prisms 512a and 512b while the prism set 514 includes two prisms 514a and 514b. As long as the central axes C3 and C4 of the mirrors 412 and 414 are not located on the same plane, or the central axes C5 and C6 of the mirrors 412 and 414 are not coplanar, the purpose of adjusting the horizontal and perpendicular locations of the image R projected onto the screen S can be achieved by shifting the mirrors 412 and 414 or the prisms 512 and 514. Therefore, all these are not apart from the scope of the invention.

Besides, although the image shift device 120 is exemplified to include the first light reflection device 112 and the second light reflection device 114 in the invention, the projecting apparatus of the invention can also include only the light reflection device 112 disposed movably relative to the image module 110 for reflecting the first light L1 to form the second light L2 which in turn is projected via the lens 130 to form an image on the screen S. That is, the second light reflection device 114 is removed from FIG. 1 and the central axis of the lens 130 and the screen S is changed to be disposed on the X-axis. The light reflection device 112 is moved along the beam of first light L1 (i.e. the optical axis Y of the image module 110) or the beam of second light L2 (i.e. the optical axis X of the lens 130) for adjusting the location of the image R on the screen S along the Y-direction. Or the projecting apparatus can also include only the light reflection device 114 disposed movably relative to the image module 110 for reflecting the first light L1 to form the second light L2 which in turn is projected via the lens 130 to form an image on the screen S. That is, the first light reflection device 112 is removed from FIG. 1 and the central axis of the image module 110 is changed to be disposed on the X-axis. The light reflection device 114 is moved along the beam of first light L1 (i.e. the optical axis X of the image module 110) or the beam of second light L2 (i.e. the optical axis Z of the lens 130) for adjusting the location of the image R on the screen S along the X-direction.

The projecting apparatus and image shift device thereof disclosed by the above-mentioned embodiment of the invention has the following advantages. The purpose of 2-D light shift and focus adjustment can be achieved by using two simples-structure prisms or mirrors, which are not coplanar, to reflect the light emitted from the image module. Without need of the conventional complicated mechanism for lens shift and focus adjustment equipped in the lens, the complication in designing and manufacturing the lens can be reduced and the cost for manufacturing the system can be lowered down.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projecting apparatus, for projecting an image onto a screen, the projecting apparatus comprising: an image module, for providing a beam of first light; a first light reflection device, having a first reflection surface, disposed movably relative to the image module for reflecting the first light to form a beam of second light, wherein moving the first light reflection device along the beam of first light or second light can adjust the location of the image on the screen in a first direction and wherein an optical axis of the first reflection surface is inclined by 45 degrees against an optical axis of the image module; a lens, for projecting the image on the screen according to the second light; a second light reflection device having a second reflection surface for reflecting the beam of second light to form a beam of third light, wherein a central axis of the second reflection surface and a central axis of the first reflection surface are not coplanar, the lens is for projecting the third light onto the screen to form the image and the second light reflection device is for adjusting the location of the image on the screen along a second direction.

2. The projecting apparatus according to claim 1, wherein the first light reflection device and the second light reflection device are prisms.

3. The projecting apparatus according to claim 1, wherein the first light reflection device and the second light reflection device are mirrors.

4. The projecting apparatus according to claim 1, wherein a central connection line of the first light reflection device and the second light reflection device and an optical axis of the image module form a first plane and a central axis of the first reflection surface is located on the first plane.

5. The projecting apparatus according to claim 4, wherein the central connection line is perpendicular to the optical axis of the image module and the central axis of the first reflection surface is inclined by 45 degrees against the optical axis of the image module.

6. The projecting apparatus according to claim 5, wherein the central connection line and the optical axis of the lens form a second plane, and the central axis of the second reflection surface is located on the second plane.

7. The projecting apparatus according to claim 6, wherein the central connection line is perpendicular to the optical axis of the image module and the central axis of the second reflection surface is inclined by 45 degrees against the optical axis of the lens.

8. The projecting apparatus according to claim 7, wherein the first plane is perpendicular to the second plane.

9. The projecting apparatus according to claim 1, wherein the first light reflection device is shifted along a central connection line of the first light reflection device and the second light reflection device to adjust the location of the image on the screen in the first direction.

10. The projecting apparatus according to claim 1, wherein the first light reflection device is shifted along an optical axis of the image module to adjust the location of the image on the screen in the first direction.

11. The projecting apparatus according to claim 1, wherein the second light reflection device is shifted along a central connection line of the first light reflection device and the second light reflection device to adjust the location of the image on the screen in the second direction.

12. The projecting apparatus according to claim 1, wherein the first light reflection device is shifted along an optical axis of the lens to adjust the location of the image on the screen in the second direction.

13. The projecting apparatus according to claim 1, wherein the first light reflection device and the second light reflection device are used for adjusting a focus location of the third light relative to the screen.

14. The projecting apparatus according to claim 1, wherein the first direction is a vertical direction and the second direction is a horizontal direction.

* * * * *